US012803678B2

(12) United States Patent
Verma et al.

(10) Patent No.: US 12,803,678 B2
(45) Date of Patent: Nov. 17, 2026

(54) IMPROVING THE BANDWIDTH OF CLASSICAL NETWORKS USING QUANTUM NETWORKS

(71) Applicant: International Business Machines Corporation, Armonk, NY (US)

(72) Inventors: Dinesh C. Verma, New Castle, NY (US); Gerald Coon, Durham, NC (US); Satishkumar Sadagopan, Leawood, KS (US); Mudhakar Srivatsa, White Plains, NY (US); Mathews Thomas, Flower Mound, TX (US); Utpal Mangla, Toronto (CA); Paridhi Verma, Mount Kisco, NY (US); Mark B. Ritter, Sherman, CT (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/186,262

(22) Filed: Mar. 20, 2023

(65) Prior Publication Data

US 2024/0322915 A1 Sep. 26, 2024

(51) Int. Cl.
*G06N 10/20* (2022.01)
*H04B 10/70* (2013.01)
(Continued)

(52) U.S. Cl.
CPC ............. *H04B 10/70* (2013.01); *G06N 10/20* (2022.01); *G06F 16/27* (2019.01); *H04L 9/0852* (2013.01)

(58) Field of Classification Search
CPC ........ H04B 10/70; G06N 10/20; G06N 10/40; G06F 16/27; H04L 9/0852
(Continued)

(56) References Cited

U.S. PATENT DOCUMENTS

| | | | |
|---|---|---|---|
| 7,975,071 | B2 | 7/2011 | Ramjee et al. |
| 9,584,576 | B2 | 2/2017 | Marshall et al. |

(Continued)

FOREIGN PATENT DOCUMENTS

| | | | |
|---|---|---|---|
| CN | 108540436 | B | 8/2020 |
| CN | 111464635 | B | 2/2022 |

(Continued)

OTHER PUBLICATIONS

Haitjema, M., "A Survey of the Prominent Quantum Key Distribution Protocols," 2007, 12 pages, retrieved from https://www.cse.wustl.edu/-jain/cse571-07/tp/quantum/index.html (Year: 2007).*

(Continued)

*Primary Examiner* — Sudhanshu C Pathak
(74) *Attorney, Agent, or Firm* — CANTOR COLBURN LLP; Joseph P. Curcuru

(57) ABSTRACT

Embodiments are related to improving the bandwidth of classical networks using quantum networks. Sender equipment transfers quantum bits over a quantum communications network to receiver equipment, the quantum bits being used to obtain entry values in a shared dictionary. The sender equipment determines a solution for an optimization problem using the entry values, where data to be transferred over a telecommunications network is expressed by the optimization problem. The sender equipment transfers the solution over the telecommunications network to the receiver equipment, where an equivalence of the data is transferred to the receiver equipment in response to the receiver equipment using the solution, the optimization problem, and the entry values to obtain the data.

20 Claims, 8 Drawing Sheets

(51) Int. Cl.
*G06F 16/27* (2019.01)
*H04L 9/08* (2006.01)

(58) Field of Classification Search
USPC ........................................................... 398/43
See application file for complete search history.

(56) References Cited

U.S. PATENT DOCUMENTS

| | | | | |
|---|---|---|---|---|
| 9,774,401 | B1 * | 9/2017 | Borrill | H04L 9/0852 |
| 10,659,558 | B2 | 5/2020 | Agrawal et al. | |
| 2008/0256356 | A1 | 10/2008 | Iyengar et al. | |
| 2011/0222596 | A1 * | 9/2011 | Huang | H03M 7/3084 375/240 |
| 2020/0293935 | A1 * | 9/2020 | Greenberg | G06N 7/08 |
| 2023/0088643 | A1 * | 3/2023 | Del Pino Ruiz | G06F 16/27 706/62 |
| 2024/0303527 | A1 * | 9/2024 | Fujisaki | G06N 10/70 |
| 2026/0121857 | A1 * | 4/2026 | Abdelsamie | H04L 9/0852 |

FOREIGN PATENT DOCUMENTS

| | | | | | |
|---|---|---|---|---|---|
| CN | 114285670 | B | | 11/2022 | |
| JP | 2020037300 | A | * | 3/2020 | B60T 8/3685 |
| JP | 2020200758 | A | * | 12/2020 | |
| WO | WO-2014055293 | A1 | * | 4/2014 | G06N 5/01 |
| WO | WO-2020037300 | A1 | * | 2/2020 | G06N 10/20 |
| WO | WO-2020200758 | A1 | * | 10/2020 | G06N 10/80 |

OTHER PUBLICATIONS

Picoquant, "Quantum Communication," PicoQuant, 2023, 8 pages, retrieved from https://www.picoquant.com/applications/category/quantum-optics/quantum-communication (Year: 2023).*

Zhao et al., "Quantum broadcast and multicast schemes based on partially entangled channel," IEEE Access, vol. 8, 2020, pp. 29658-29666. (Year: 2020).*

Wang et al., Multicast Scheme Based on Fidelity Metrics in Quantum Networks, IEEE Access, vol. 7, May 9, 2019, pp. 65703-65713. (Year: 2019).*

Tann, W., "Quantum Remote Entanglement for Medium-Free Secure Communication?" arXiv, 2022, 15 pages, retrieved from https://arxiv.org/abs/2202.00830 (Year: 2022).*

Li et al., "Fidelity-Guaranteed Entanglement Routing in Quantum Networks," arXiv, 2022, 16 pages, retrieved from https://arxiv.org/abs/2111.07764 (Year: 2022).*

Metwaly et al., "Architecture of Decentralized Multicast Network Using Quantum Key Distribution and Hybrid WDM-TDM," Advances in Information Science and Computer Engineering, Feb. 2015, pp. 504-518. (Year: 2015).*

Haitjema et al.*

Li et al.*

Metwaly et al.*

Picoquant.*

Tann.*

Wang et al.*

Zhao et al.*

Raigoza et al., "Evaluating Performance of Symmetric Encryption Algorithms," International Conference on Computational Science and Computational Intelligence, 2016, pp. 1378-1381.

Xenakis et al., "A generic characterization of the overheads imposed by IPsec and associated cryptographic algorithms," Science Direct, Computer Networks 50, 2006, pp. 3225-3241.

* cited by examiner

100

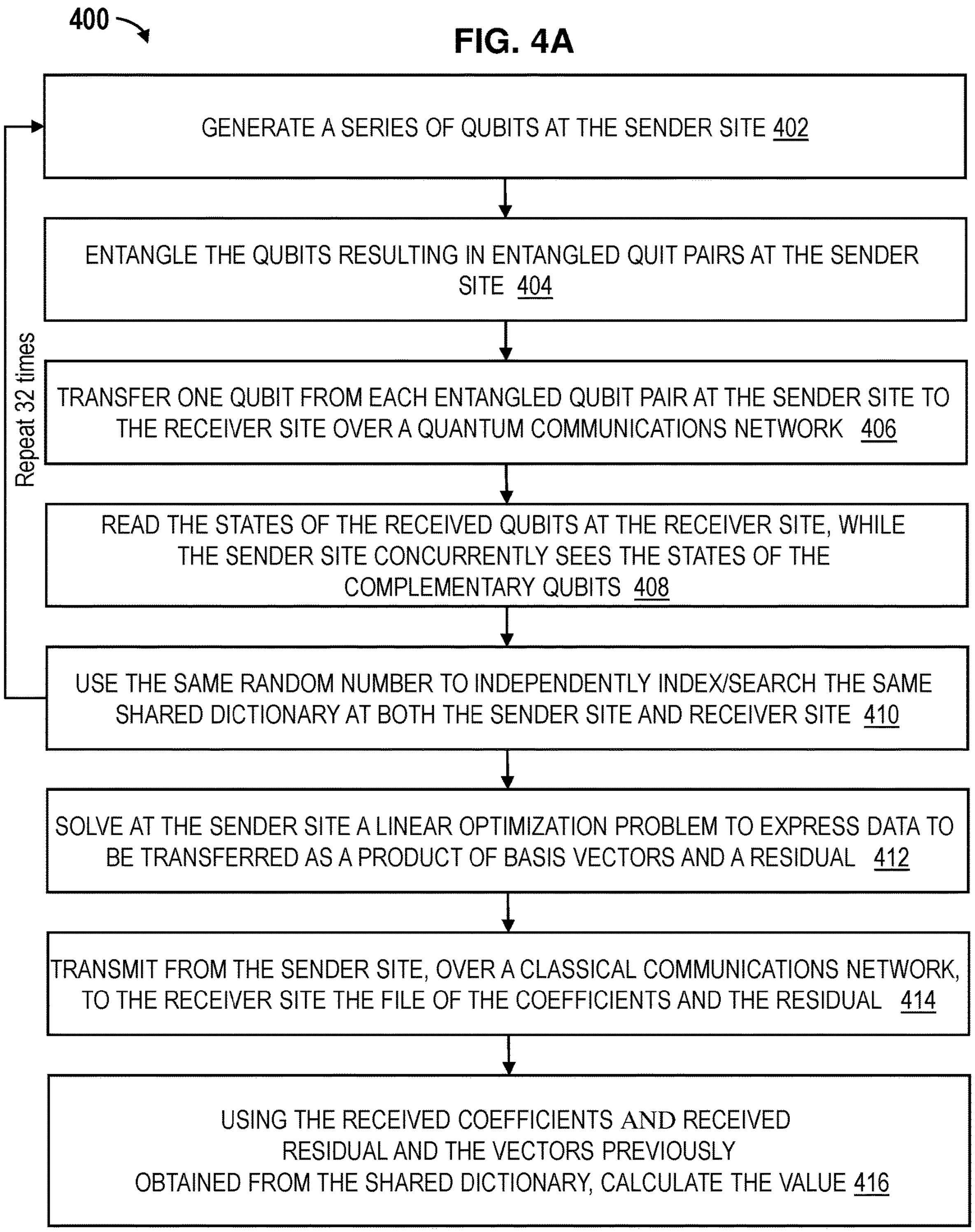
400
FIG. 4A
GENERATE A SERIES OF QUBITS AT THE SENDER SITE 402
ENTANGLE THE QUBITS RESULTING IN ENTANGLED QUIT PAIRS AT THE SENDER SITE 404
TRANSFER ONE QUBIT FROM EACH ENTANGLED QUBIT PAIR AT THE SENDER SITE TO THE RECEIVER SITE OVER A QUANTUM COMMUNICATIONS NETWORK 406
READ THE STATES OF THE RECEIVED QUBITS AT THE RECEIVER SITE, WHILE THE SENDER SITE CONCURRENTLY SEES THE STATES OF THE COMPLEMENTARY QUBITS 408
USE THE SAME RANDOM NUMBER TO INDEPENDENTLY INDEX/SEARCH THE SAME SHARED DICTIONARY AT BOTH THE SENDER SITE AND RECEIVER SITE 410
Repeat 32 times
SOLVE AT THE SENDER SITE A LINEAR OPTIMIZATION PROBLEM TO EXPRESS DATA TO BE TRANSFERRED AS A PRODUCT OF BASIS VECTORS AND A RESIDUAL 412
TRANSMIT FROM THE SENDER SITE, OVER A CLASSICAL COMMUNICATIONS NETWORK, TO THE RECEIVER SITE THE FILE OF THE COEFFICIENTS AND THE RESIDUAL 414
USING THE RECEIVED COEFFICIENTS AND RECEIVED RESIDUAL AND THE VECTORS PREVIOUSLY OBTAINED FROM THE SHARED DICTIONARY, CALCULATE THE VALUE 416

450

IMPROVING THE BANDWIDTH OF CLASSICAL NETWORKS USING QUANTUM NETWORKS

BACKGROUND

The present invention generally relates to computer systems, and more specifically, to computer-implemented methods, computer systems, and computer program products configured and arranged for improving the bandwidth of classical networks using quantum networks.

A telecommunications network is a group of nodes interconnected by telecommunications links that are used to exchange messages between the nodes. The links may use a variety of technologies based on the methodologies of circuit switching, message switching, or packet switching, to pass messages and signals. Multiple nodes may cooperate to pass the message from an originating node to the destination node, via multiple network hops. For this routing function, each node in the network is assigned a network address for identification and locating it on the network. The collection of addresses in the network is called the address space of the network.

In telecommunications and computer networking, a network packet is a formatted unit of data carried by a packet-switched network. A packet consists of control information and user data. User data is also known as the payload. Control information provides data for delivering the payload (e.g., source and destination network addresses, error detection codes, or sequencing information). Typically, control information is found in packet headers and trailers. A packet is also called a datagram, a segment, a block, a cell, or a frame, depending on the protocol used for the transmission of data. When data has to be transmitted, it is broken down into similar structures of data before transmission, called packets, which are reassembled to the original data chunk once they reach their destination. The structure of a packet depends on the type of packet it is and on the protocol. Normally, a packet has a header and a payload. The header keeps overhead information about the packet, the service, and other transmission-related data. For example, data transfer over the Internet requires breaking down the data into Internet Protocol (IP) packets, and an IP packet generally includes the following: the source IP address, which is the IP address of the machine sending the data; the destination IP address, which is the machine or device to which the data is sent; and the sequence number of the packets, which is a number that puts the packets in order such that they are reassembled in a way to get the original data back exactly as it was prior to transmission.

SUMMARY

Embodiments of the present invention are directed to computer-implemented methods for improving the bandwidth of classical networks using quantum networks. A non-limiting computer-implemented method includes transferring, by sender equipment, quantum bits over a quantum communications network to receiver equipment, the quantum bits being used to obtain entry values in a shared dictionary. The computer-implemented method includes determining, by the sender equipment, a solution for an optimization problem using the entry values, where data to be transferred over a telecommunications network is expressed by the optimization problem. The computer-implemented method includes transferring, by the sender equipment, the solution over the telecommunications network to the receiver equipment, where an equivalence of the data is transferred to the receiver equipment in response to the receiver equipment using the solution, the optimization problem, and the entry values to obtain the data.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A is a flowchart of a computer-implemented method for transferring data in a manner that improves the bandwidth of classical networks using quantum networks according to one or more embodiments of the present invention;

DETAILED DESCRIPTION

Figure 1:
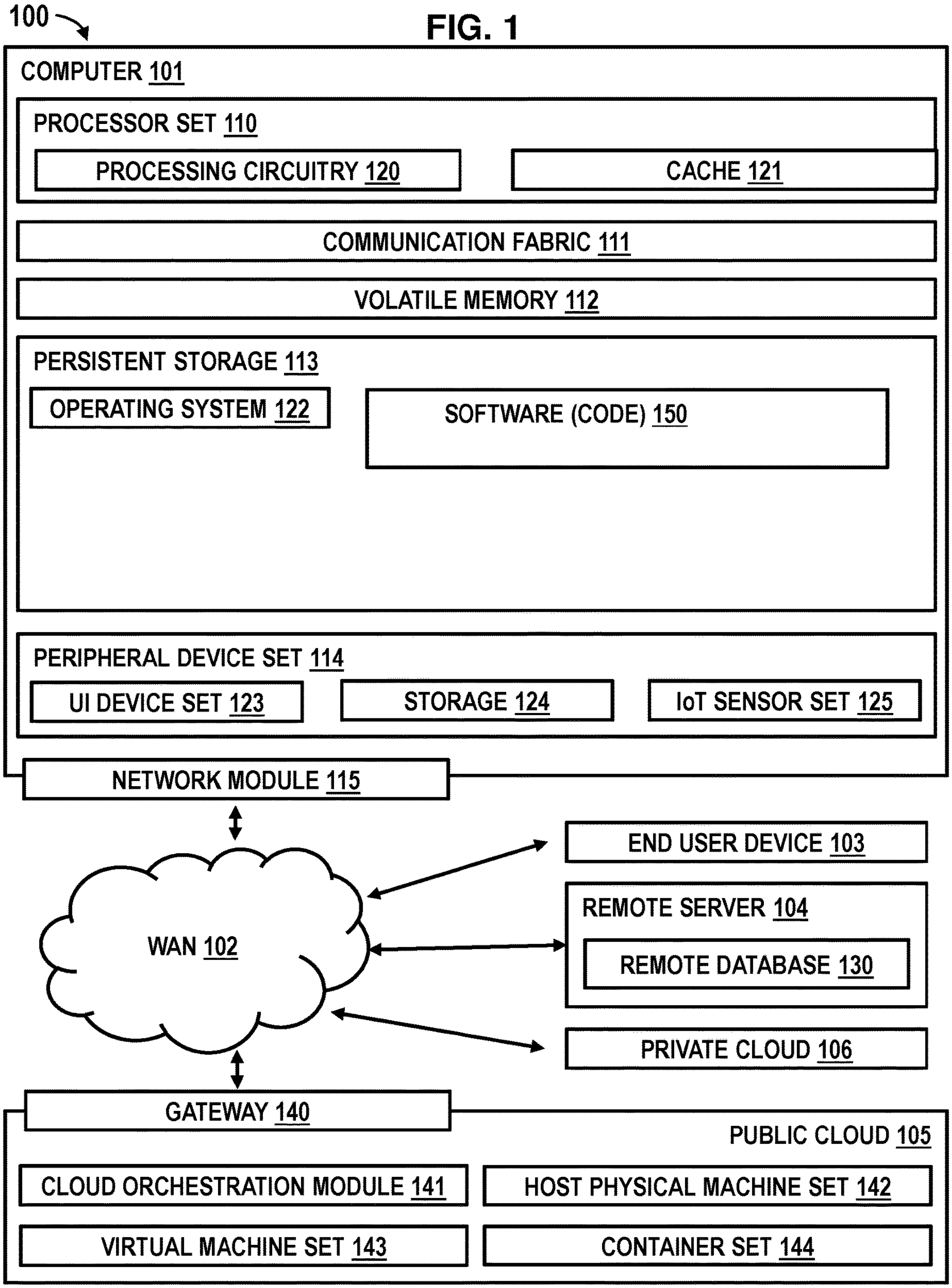
FIG. 1 depicts a block diagram of an example computing environment for use in conjunction with one or more embodiments of the present invention.

One or more embodiments of the invention describe computer-implemented methods, computer systems, and computer program products configured and arranged to improve the bandwidth of classical networks using a quantum network. The classical communications network is considered a conventional network that uses circuit switching, message switching, and/or packet switching to pass messages and signals. One or more embodiments use the quantum network to enhance the operational characteristics of the conventional network. According to one or more embodiments, the quantum network is utilized as a support network with the characteristic of securely generating and sending a random number. One or more embodiments can address weaknesses and issues with the classical network infrastructure. One or more embodiments can improve classical networks by generating the same random number between sender and receiver.

Random numbers are the foundation of many aspects of communication technology. Although true randomness may be difficult to generate, an easy repeatable source of entropy can provide a source of randomness simultaneously for the sender and receiver in accordance with one or more embodiments. Using quantum communication networks, one or more embodiments are configured to leverage three properties of qubits including superposition, no-cloning, and entanglement. A qubit exists in a superposition of two states of 0 or 1. For example, the spin of an electron is measured a vector of a unit size and the spin of the electron can be in a superposition of two states. With respect to no cloning, a qubit cannot be duplicated, and if a qubit is read, its state collapses to either 0 or 1. If a qubit is tampered with, its state changes. An arbitrary state cannot be copied, and therefore, the qubit provides a level of security in quantum transmissions. With respect to entanglement, two qubits can be entangled with each other such that a change in state of one changes the state of another. For example, two entangled photons can exist in a superposition of states between 0 and 1, such that reading/measuring the state of one photon automatically reveals the complementary state of the other photon. For a two entangled qubits, having a complementary state means that one entangled qubit has the opposite state of the other entangled qubit.

Qubit states may be transferred using techniques such as photon polarization, phase encoding, entanglement, etc., over optical fibers (e.g., optical fiber network) or free space. According to one or more embodiments, a random number is generated without a predetermined value that becomes available at sender and receiver. The transmission is highly secure due to qubit properties. The value can be confirmed by the sender and/or receiver over a classical communication network. The weakness of a classical communications network is that a secure communication adds overhead in the communication, which could be substantial depending on the encryption scheme. For example, when a classical communication network has a throughput of X megabits per second (Mbps), the secure communication has a throughput Y Mbps<X Mbps. However, one or more embodiments are configured such that the communication system enables the secure communication with a throughput of Z Mbps>X Mbps.

A qubit or quantum bit is a basic unit of quantum information and is the quantum version of the classic binary bit physically realized with a two-state device. A qubit is a two-state (or two-level) quantum-mechanical system. Example states of a qubit can include the spin of the electron in which the two levels can be taken as spin up and spin down, or the polarization of a single photon in which the two states can be taken to be the vertical polarization and the horizontal polarization.

Quantum entanglement is a physical phenomenon that occurs when pairs of particles are generated or interact in ways such that the quantum state of each particle cannot be described independently of the others, even when the particles are separated by a large distance. Instead, a quantum state must be described for the system as a whole. To put it another way, an entangled system is defined to be one whose quantum state cannot be factored as a product of states of its local constituents. In other words, they are not individual particles but are an inseparable whole. In entanglement, one constituent cannot be fully described without considering the other(s). It is noted that the state of a composite system is expressible as a sum, or superposition, of products of states of local constituents.

A photon is an elementary particle, which is a quantum of light along with all other forms of electromagnetic radiation. A photon carries energy proportional to the radiation frequency and has zero rest mass. The Bell states are a concept in quantum information science and represent the essence of entanglement. They are subject to the Bell inequality. An EPR pair is a pair of qubits (quantum bits), particles, or photons, which are in a Bell state together, in other words, entangled with each other. Unlike classical phenomena such as the electromagnetic and gravitational fields, entanglement is invariant under distance of separation and is not subject to relativistic limitations such as the speed of light. The Bell measurement is an important concept in quantum information science. It is a joint quantum-mechanical measurement of two qubits that determines which of the four Bell states the two qubits are in. If the qubits were not in a Bell state before, they get projected into a Bell state (according to the projection rule of quantum measurements), and as Bell states are entangled, a Bell measurement is an entangling operation.

One or more embodiments provide a method to obtain a greater communication throughput using a combination of classical and quantum communications networks by exchanging a set of quantum bits on the quantum network as a secure random number, by using the quantum bits exchanged to determine an optimization problem using consistent dictionaries on both the sender and receiver sites, and by using the output of the optimization problem to determine the data being sent on the classical communication network. In one or more embodiments, different formulations of optimization problems may be utilized including linear minimization optimization problems, least square reduction optimization problems, etc. One or more embodiments can dynamically decide how many random numbers to exchange, and when the residual is greater than a predefined threshold, the system can exchange one more quantum random number.

The network traffic of a communications network may contain hundreds, thousands, and/or millions of network packets, all of which is referred to as "big data". In accordance with one or more embodiments, the enormous size and speed of network packet traffic requires management, processing, and search by a machine (such as computer 101), for example, using computer-executable instructions; network packets across the network could not be practically managed, stored, analyzed, and/or processed as discussed herein within the human mind. Embodiments optimize network flow between computers, and accordingly, improve the operations of computers and networks that connect computers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as packet optimization code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
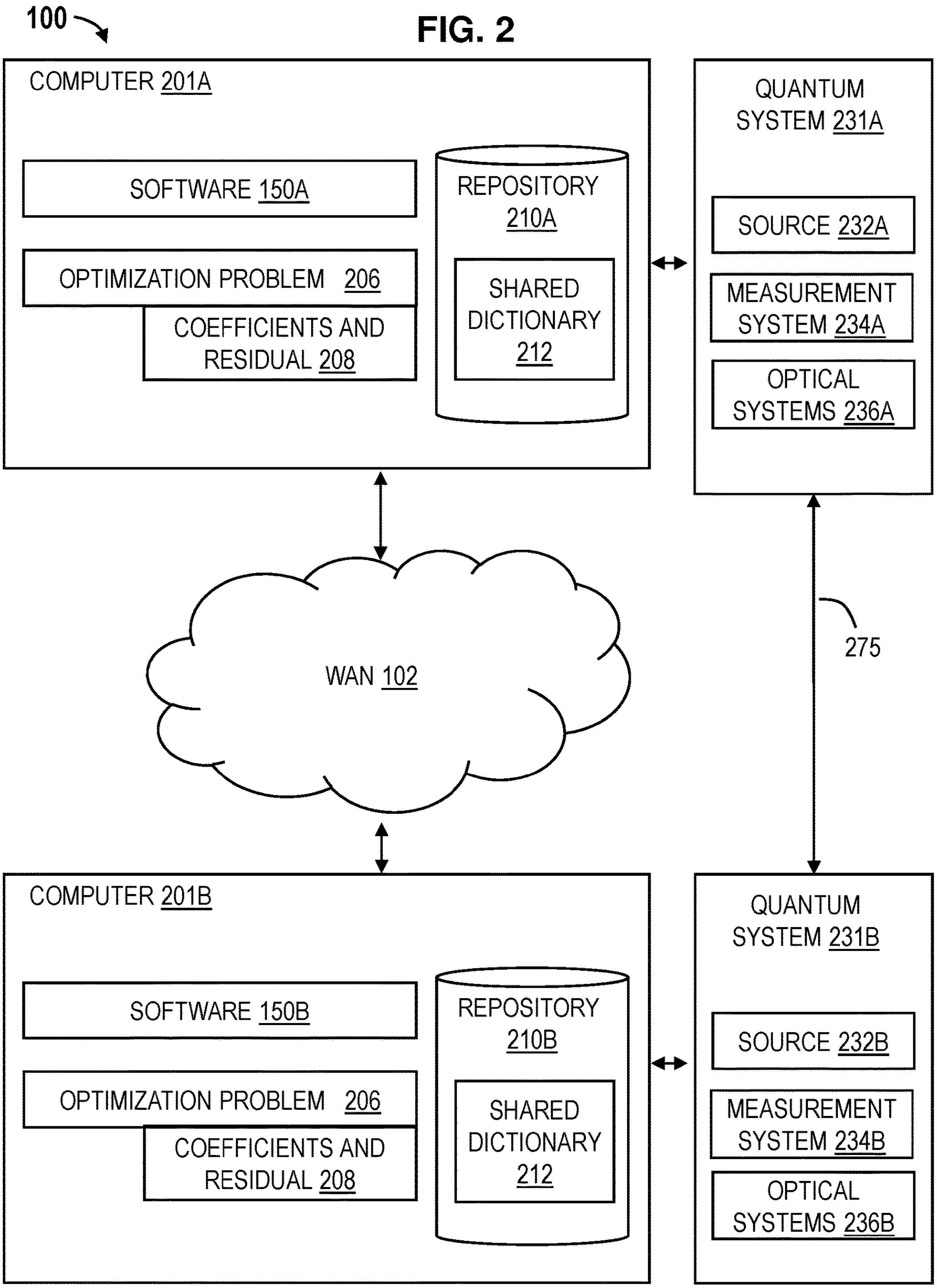
FIG. 2 depicts a block diagram of the example computing environment configured with further details for improving the bandwidth of classical networks using quantum networks according to one or more embodiments of the present invention.

FIG. 2 depicts the computing environment 100 with further details for improving the bandwidth of classical networks using quantum network according to one or more embodiments. Accordingly, embodiments improve data transfer over communications networks, thereby improving bandwidth because less bandwidth is utilized to transfer the same amount of data. In FIG. 2 and other figures herein, some details of the computing environment 100 may be omitted so as not to obscure the figure while new details are presented. FIG. 2 represents numerous computer systems that can communicate with each other over the WAN 102. The computing environment 100 includes a computer system 201A and a computer system 201B. For explanation purposes, the computer system 201A may be represented as the sender computer while the computer system 201B may be represented as the receiver computer, although both computer systems can send and receive the data discussed herein. The computer system 201A and computer system 201B may generally be referred to as computer systems 201. The computer system 201A and computer system 201B include software 150A and 150B, repositories 210A and 210B each having its own access to and/or copy of a shared dictionary 212, and (eventually) optimization problem 206, respectively. The software 150A and 150A may generally be referred to as software 150, and the software 150 may include the functionality of, be coupled to, and/or call various algorithms, application programming interfaces (APIs), and/or other pieces of known software to operate as discussed herein.

In the computing environment 100, a quantum system 231A is coupled to the computer system 201A and a quantum system 231B is coupled to the computer system 201B. The quantum systems 231A and 231B may generally be referred to as quantum systems 231. The quantum systems 231A and 231B include all the equipment for communicating qubits over fiber optic cables via the WAN 102, via other fiber optic cable of a quantum communications network 275, and or via a combination of fiber optic cables in the WAN 102 and the quantum communications network 275. In some embodiments, the WAN 102 may be or include a classical communications network. The quantum systems 231A and 231B can include sources 232A and 232B for generating light including non-classical light sources and classical light sources, measurement systems 234A and 234B for measuring electrons, photons, signals, etc., and optical systems 236A and 236B including lens, mirrors, beam splitters, wave guides, encoders, etc., respectively. Non-classical light is light that cannot be described using classical electromagnetism, and characteristics of non-classical light are described by the quantized electromagnetic field and quantum mechanics. Common forms of non-classical light used in quantum information are Fock states (including single-photon states) and squeezed states. Further, the quantum systems 231A and 231B may include superconducting qubit structures, readout resonators for reading the superconducting qubit structures, and a control system (and/or measurement system) for sending and receiving signal (pulses) in order to energize the superconducting qubit structures, to perform operations (e.g., gating), and to receive results. In one embodiment, the quantum system 231A could include a system of beam-splitters and photodetectors to enable quantum entanglement communicating over fiber-optic links. In another embodiment, the quantum system 231A could include an ion-trap system enabling quantum computing. In another embodiment, the quantum system 231A could include a system using nitrogen vacancy center within a diamond. In one or more embodiments, free space can be used for communication instead of an optical fiber.

Figure 3:
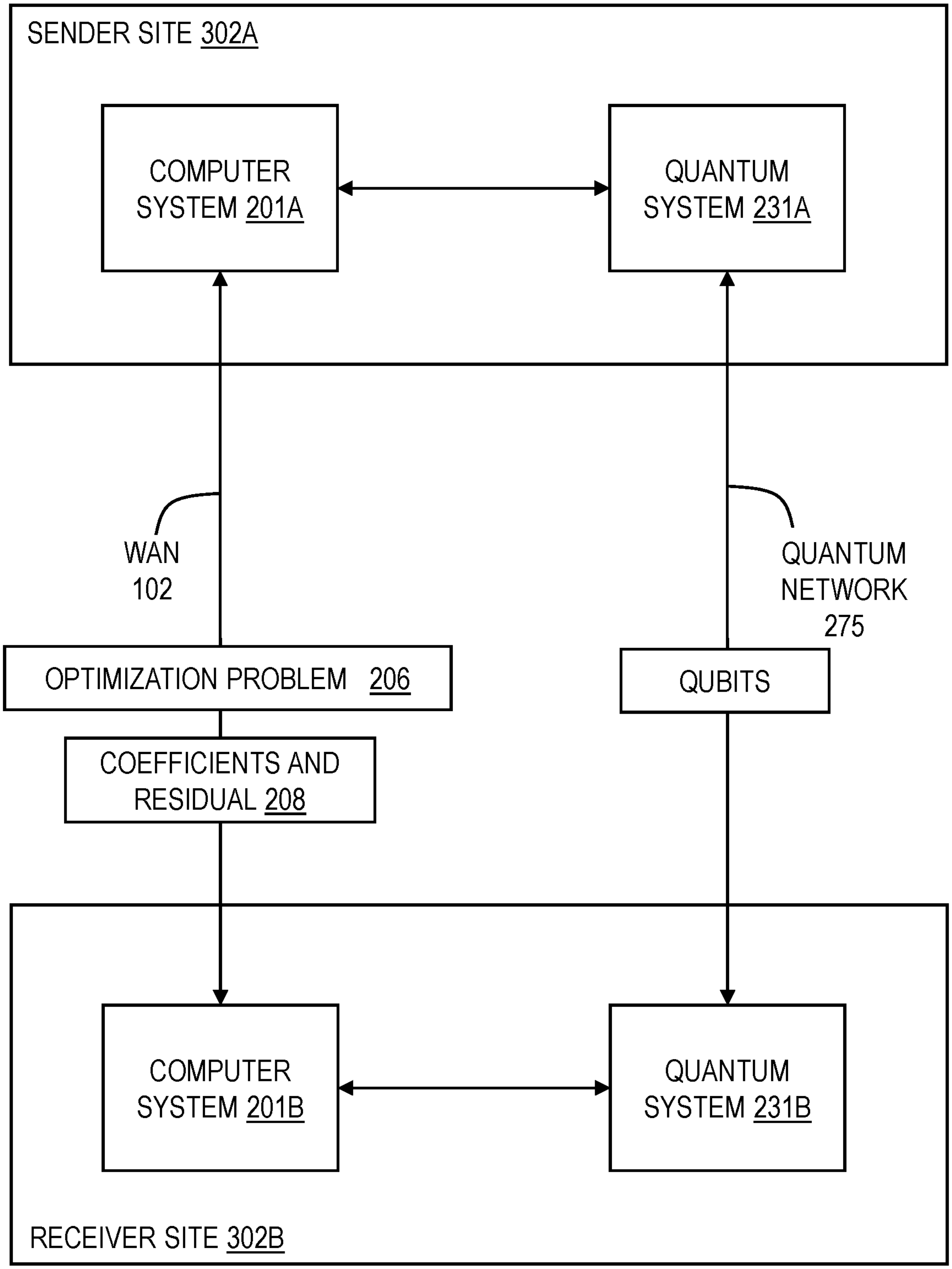
FIG. 3 depicts a block diagram of the example computing environment for improving the bandwidth of classical networks using quantum networks according to one or more embodiments of the present invention.

FIG. 3 depicts a block diagram of an example computing environment 100 for improving the bandwidth of classical networks using quantum network according to one or more embodiments. FIG. 3 illustrates a sender site 302A having the computer system 201A coupled to the quantum system 231A, along with a receiver site 302B having the computer system 201B coupled to the quantum system 231B. Various scenarios are discussed herein for transmitting data from the sender site 302A to the receiver site 302B, but it should be appreciated that both the sender site 302A and the receiver site 302B can send and receive data according to one or more embodiments.

FIG. 4A is a flowchart of a computer-implemented method 400 for transmitting and receiving data using a classical communications network supported by a quantum communications network resulting in improved bandwidth for the classical communications network according to one or more embodiments. An example scenario is provided for transferring M amount of data (e.g., 1 gigabyte (GB) of data), and the M amount of data to be transferred can also be identified as vector $y\uparrow$. In the example scenario, the sender site 302A is transferring the M amount of data while the receiver site 302B is receiving the M amount of data. As can be seen, the M amount of data can be obtained at the receiver site 302B without the M amount of data having to be sent through the WAN 102 (e.g., classical communications network) and/or the quantum communications network 275.

At blocks 402 and 404, the software 150A of computer system 201A at the sender site 302A is configured to communicate with the quantum system 231A to cause and/or instruct the quantum system 231A to generate a series of qubits and to entangle the qubits into entangled qubits pairs. The computer system 201A may control the source 232A to generate qubits and/or entangled qubit pairs. Entangled qubit pairs can be referred to as qubit pairs, entangled qubits, pairs of qubits, entangled photons, entangled particles, etc. Qubits can be entangled using any technique known to one of ordinary skill in the art, and each entangled qubit is in a superposition state. For example, the source 232A can generate photons, and spontaneous parametric down-conversion (SPDC) sources may be utilized to entangle photons, where the entangled photons are qubit pairs. In an example scenario, the quantum system 231A generates the requested amount of entangled qubit pairs, for example, 32 qubit pairs, such that one qubit from each entangled qubit pair can be transferred to the receiver site 302B while the other qubits from each entangled qubit pair remains at the sender site 302A.

As noted herein, a qubit exists in a superposition of two states of 0 or 1. Examples of qubits can include an electron in which the spin of the electron, for example, represents the states of the qubit. A photon can be a qubit. For the photon, polarization encoding can be utilized to establish the two states of the photon through use of a polarizing beam splitter, where vertical polarization is one state and horizontal polarization is the other state. Additionally, phase encoding can be utilized to establish two states for a photon. Any known entanglement technique can be utilized to entangle pairs of electrons, pairs of photons, etc., as understood by one or ordinary skill in the art.

Referring to FIG. 4A, at block 406, the software 150A of computer system 201A at the sender site 302A is configured to communicate with the quantum system 231A to cause and/or instruct the quantum system 231A to transmit one qubit from each entangled qubit pair to the quantum system 231B at the receiver site 302B over a quantum communications network 275. The sources 232A and optical systems 236A can be utilized to transmits a series of qubits from the quantum system 231A to quantum system 231B. Accordingly, the quantum system 231B receives, in a series, one qubit in each entangled pair of qubits from the quantum system 231A. Following the example scenario of 32 qubit pairs, a 32 bit binary integer has been randomly and securely exchanged between the quantum system 231A and quantum system 231B. The quantum system 231B at the receiver site 302B has 32 qubits while the quantum system 231A at the sender site 302A has the complementary 32 qubits. The states as of the 32 qubits are to be utilized to as a random number. If the process is repeated 16 times, both the senders and receivers will have access to 16 random numbers, where each random number is 32 bits long. In general, such an exchange will result in both the sender and the receiver getting M random numbers where each random number is K bits long.

In some embodiments, the sender and receiver may opt to get M random numbers where each random number is K bits long by having the sender transmit a qubit sequence of M*K bits, which is then divided into M random numbers, and M is predetermined or negotiated on the classical network. In other embodiments, the sender and receiver may opt to get M random numbers by putting in a time-delay before the transmission of each sequence of qubits.

As discussed herein, quantum communications is the exchange of information carriers that can support superpositions and entanglement and cannot be operationally accomplished with classical information exchange. The communication carriers of a quantum network are qubits. The quantum system 231A of the sender site 302A and the quantum system 231B of the receiver site 302B can include sources (e.g., sources 232A and 232B) of nonclassical light, single photon detectors (e.g., in the measurement systems 234A and 234B), and transducers. The communication link of the quantum communications network 275 may include fiber optic cable, quantum repeaters, quantum memory, etc., in order to transfer the qubits.

At block 408, using the measurement system 234B, the quantum system 231B at the receiver site 302B is configured to read the states of the received qubits, and the quantum system 231A concurrently sees the states of the complementary qubits at the sender site 302A, where the states as the sender site 302A is the complement of the states read at the receiver site 302B. In one or more embodiments, the quantum system 231A at the sender site 302A can read the states of its non-transferred qubits, which causes the quantum system 231B to see the states of its qubits with complementary values.

When the quantum system 231B at the receiver site 302B reads the states of the received qubits, this results in the states collapsing (being known) for the complementary qubits of the quantum system 231A at the sender site 302A, and reading the states of the qubits reveals the a random number at both the sender site 302A and the receiver site 302B. If 32 qubits are sent to the receiver site 302B in the example scenario, this results in 32 different states of 1's and 0's of the qubits, where the 32 different states form the random number [01011 . . . 0] of 32 bits. The states are in the order in which they were sent and/or received. In the random number [01011 . . . 0], the state of the first qubit sent/received is 0, the second qubit is 1, the third qubit is 0, the fourth qubit is 1, the fifth qubit is 1, through the sixteenth qubit sent/received which is 0. Both the sender site 302A and receiver site 302B have the same random number of 32 bits based on the software 150A of the computer system 201A of the sender site 302A knowing that its values for the complementary qubits are the opposite. That is, the software 150A of the computer system 201A can switch the value for each bit of the 32 bits to the opposite value in order to result in the same 32 bit random number [01011 . . . 0] as the receiver site 302B. Conversely, the software 150B of the computer system 201B can switch the value for each bit of the 32 bits to the opposite value in order to result in the same 32 bit random number as the sender site 302A.

Figure 6:
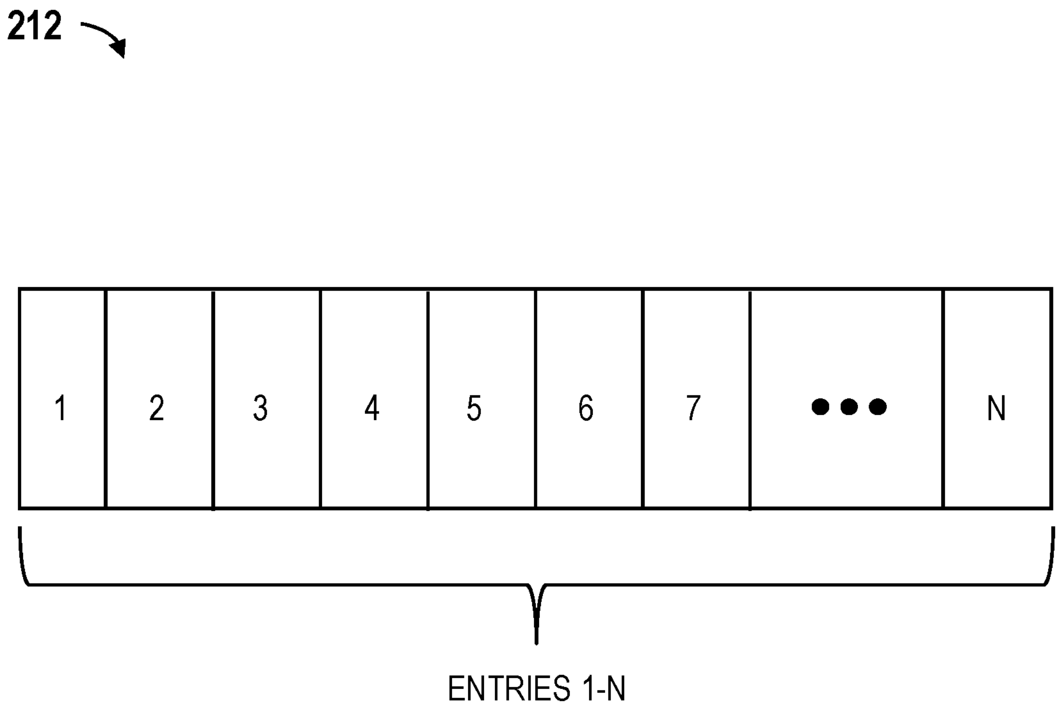
FIG. 6 depicts a block diagram of an example shared dictionary according to one or more embodiments of the present invention.

Referring to FIG. 4A, at block 410, the software 150A of the computer system 201A and the software 150B of the computer system 201B are each configured to use the same random number to independently search their respective shared dictionaries 212. The shared dictionary 212 is the same at both the sender site 302A and receiver site 302B. FIG. 6 depicts a block diagram of an example shared dictionary 212 according to one or more embodiments of the present invention. In the example scenario, the shared dictionary 212 may have 216 entries totaling 64,000 (64 K) entries, where each entry is an index to 1 GB of data. There can be 1-N entries, where N is the last number of entries as depicted in FIG. 6. In this example, N can be 64,000. The entries may be randomly created. As an example, the entries in the shared dictionary 212 may be created by taking offsets at random interval from a large data set, e.g., by selecting a random starting position from the sequence of books at Project Gutenberg site, and reading 1 GB of consecutive data. The entry in the shared dictionary could be the location of the 1 GB file on local storage medium.

When the sender site 302A transmits one or more random numbers to the receiver site 302B over the quantum network 275, the sender and receiver can both use each of the random number to look into the shared dictionary. Each random number should be N bits long if the shared dictionary consist of $2^N$ entries. In this example, the dictionary is $2^{32}$ entries long, so each random number is 32 bits long (e.g., N=32). If 16 random numbers are transmitted, both the sender and receiver can use the shared dictionary to get 16 files of 1 GB each. These files can be referred to these files as $x_1$, $x_2$, . . . $X_{16}$. In some embodiments, the random number may be transformed into another index using a hash function or transformation, and the dictionary can be of a different size. As an example, for a 32 bit long random number, every second bit can be selected to result in a 16 bit long index, or to consecutive bits can be XORed together to result in a 16 bit long index. This can look up entries in a dictionary consisting of 216 entries. In other embodiments, the if the random number value is V and the dictionary size is D entries, the value of V module D, i.e., the remainder left after V is divided by D can be used as the index into the dictionary. Suppose the software 150A of the computer system 201A has the objective to send a 1 GB file y↑ to computer system 201B.

At block 412, the software 150A of the computer system 201A is configured to solve a problem which minimizes the amount of additional data to be sent while enabling the computer system 201B to determine the value of y. One way to make this determination is to solve an optimization problem (such as an optimization problem 206) to express y↑, the data to be transferred, as a linear combination of basis vectors and a residual (i.e., remainder). The optimization problem may use a linear programming algorithm. Continuing the example scenario, if the computer system 201A is required to transfer 1 GB of data y↑ to the computer system 201B at the receiver site 302B, the software 105A selects, creates, uses, etc., a linear optimization problem that equals to the value y↑, has coefficients $\alpha_j$, where j is the total number of random numbers sent/received, for example, 32 random numbers, and has the residual β. The linear optimization problem can be, for example, $$y\uparrow = \sum_1^j \alpha_j x_j \uparrow + \beta = (\alpha_1 x_1 + \alpha_2 x_2 + \alpha_3 x_4 \ \ldots + \alpha_{16} x_{16}) + \beta,$$

which uses $x_1$, $x_2$, . . . $x_{16}$ as the basis vectors; when the linear optimization problem is solved as a minimization, this solution results in the coefficients $\alpha_j$ (i.e., $\alpha_1$, $\alpha_2$, $\alpha_3$, . . . $\alpha_{16}$) and residual β, based on using $x_j$ and the y↑ (as the M amount of data). The y↑ as the M amount of data could be representative a large video file. Using the values from the solution, software 150A can create a file 208 that includes the coefficients $\alpha_j$ (i.e., $\alpha_1$, $\alpha_2$, $\alpha_3$, . . . $\alpha_{16}$) and residual β for the solved optimization problem 206, based on the M amount of data (i.e., y↑) to be transferred.

At block 414, the software 150A of the computer system 201A at the sender site 302A is configured to transmit, over a classical communications network such as WAN 102, to the software 150B of the computer system 201B at the receiver site 302B the file 208 of the coefficients $\alpha_j$ (i.e., $\alpha_1$, $\alpha_2$, $\alpha_3$, . . . $\alpha_{16}$) and the residual β.

At block 416, using the received coefficients $\alpha_j$ (i.e., $\alpha_1$, $\alpha_2$, $\alpha_3$, . . . $\alpha_{16}$), the residual β, and the vectors $x_1$, $x_2$, $x_3$, $x_4$, . . . $x_{16}$ that were previously obtained from the shared dictionary 212, the software application 150B at the receiver site 302B is configured to solve the linear optimization problem for the value of y↑. Once the software 150B of the computer system 201B uses the coefficients to calculate the value of $$\sum_1^j \alpha_j x_j \uparrow + \beta,$$

the value of y↑ has been transferred from the sender site 302A to the receiver site 302B and is therefore available for use. Accordingly, the software 150B has obtained the value of y↑, which is the M amount of data, without having to transfer the M amount of data over the WAN 102 and/or the quantum communications network 275. The linear optimization problem is obtained in advance by the receiver site 302B.

In some embodiments, the linear optimization problem would be the calculation of the expression $$\sum_1^j \alpha_j x_j \uparrow + \beta = (\alpha_1 x_1 + \alpha_2 x_2 + \alpha_3 x_4 \ \ldots + \alpha_{16} x_{16}) + \beta$$

which is predetermined and agreed upon by both the sender and the receiver. In other embodiments, the sender may transmit the code that runs the optimization problem in a file which can be invoked by the receiver with the inputs of different $\alpha_i$, $x_i$ and β. In some embodiments, the linear optimization problem may be transmitted as a neural network which takes the values of different $\alpha_i$, $x_i$ and β and produces y.

The linear optimization method is just one of the many ways to minimize the amount of data that needs to be transferred. In another embodiment, the software 150A of the computer system 201A may choose to use non-linear optimization methods to minimize the amount of data to be transferred or compute another program which can calculate the value of y↑ from $x_1$, $x_2$, . . . $X_{16}$. It can also choose to use fewer or more number than 16 to transmit, and choose to have each number be of less or more than 32 bits. In another embodiment, it may choose to transmit a program that will produce the values of coefficients $\alpha_j$ (i.e., $\alpha_1$, $\alpha_2$, $\alpha_3$, . . . $\alpha_{16}$), the residual β when executed by the receiver in block 415 instead of transmitting the coefficients directly.

As technical solutions and benefits, one or more embodiments use a shared dictionary (i.e., consistent dictionary) for both the sender and receiver sites to significantly reduce the amount of data that needs to be transferred. The secure random number exchanged is the quantum number used as key into the shared dictionary. The secure number is used as the index to each entry in the shared dictionary, and the data at each entry is treated as a basis vector x↑. One or more embodiments solve a linear optimization problem to express the data to be transferred as a product of basis vectors and a residual. According to one or more embodiments, the sender transmits the coefficients and residuals using a classical encryption technique, where the transferred coefficients and residuals are much smaller than the actual data being transferred, thereby resulting in a significant compression.

Figure 4B:
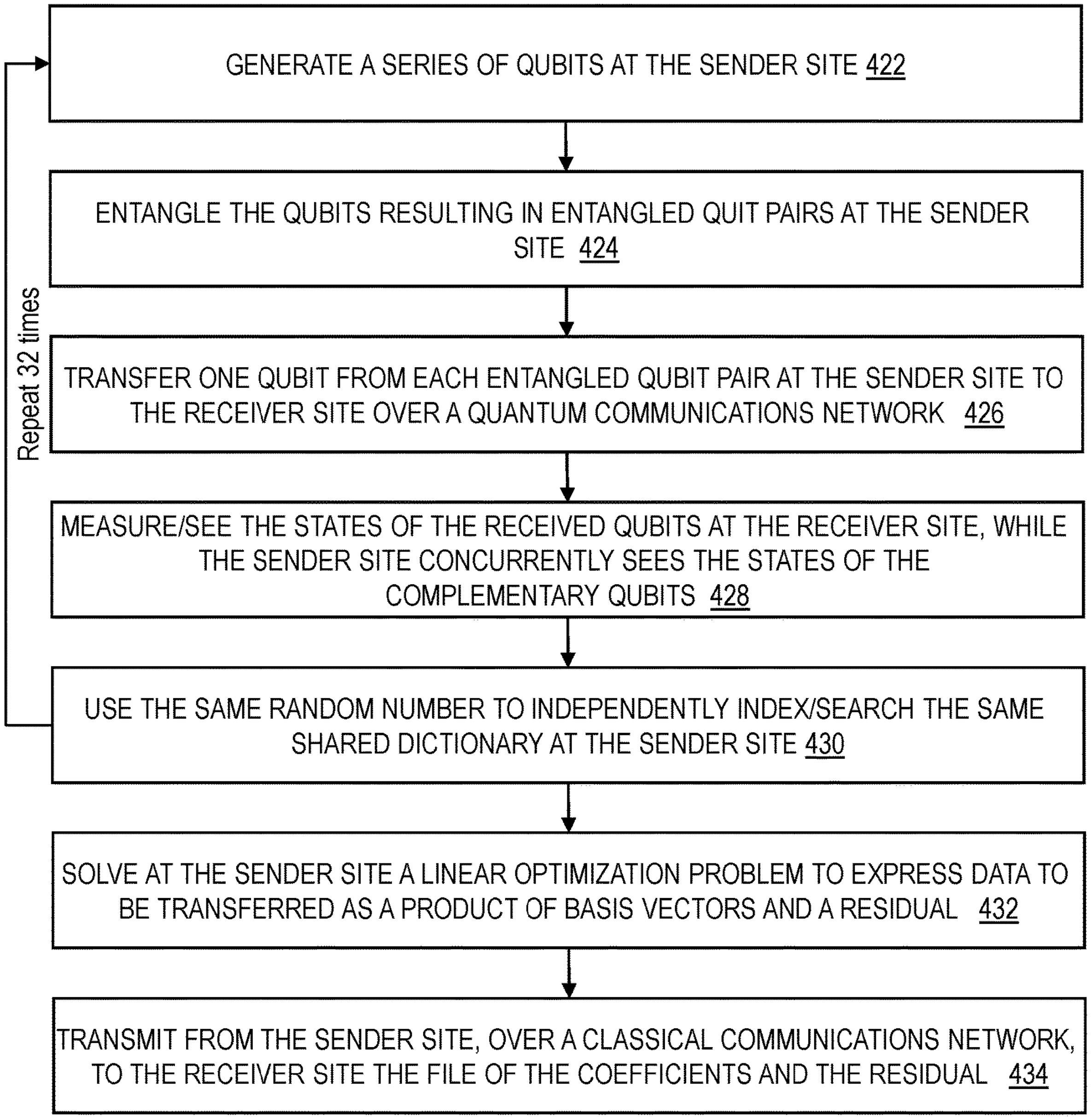
FIG. 4B is a flowchart of a computer-implemented method for transferring data in a manner that improves the bandwidth of classical networks using quantum networks according to one or more embodiments of the present invention.

FIG. 4B is a flowchart of a computer-implemented method 420 for transmitting data using a classical communications network supported by a quantum communications network resulting in improved bandwidth for the classical communications network according to one or more embodiments. FIG. 4B illustrates the transfer of the data from the sender's perspective. Some details described in FIG. 4A may not be repeated in FIG. 4B.

At blocks 422 and 424, the software 150A of computer system 201A at the sender site 302A is configured to communicate with the quantum system 231A to cause and/or instruct the quantum system 231A to generate a series of qubits and to entangle the qubits into entangled qubits pairs. At block 426, the software 150A of computer system 201A at the sender site 302A is configured to communicate with the quantum system 231A to cause and/or instruct the quantum system 231A to transmit one qubit from each entangled qubit pair to the quantum system 231B at the receiver site 302B over the quantum communications network 275. At block 428, the quantum system 231A at the sender site 302A can measure its non-transferred qubits or automatically see the states of its non-transferred qubits upon the receiver site 302B reading its qubits. The states of the non-transferred qubits are the complement of the random number known by the receiver site 302B, thus the sender site 302A has/knows the same random number as the receiver site 302B such that the random number can be used below. At block 430, the software 150A of the computer system 201A is configured to use the same random number to independently search its shared dictionary 212 in order to obtain, for example, 16 entries from the shared dictionary 212, which assumes that 16 sequences of 32 qubits are transferred in the example scenario. At block 432, the software 150A of the computer system 201A is configured to solve the problem which minimizes the amount of additional data to be sent while enabling the computer system 201B to determine the value of y, using the values of the 32 entries of $x_1$, $x_2$, . . . $x_{16}$. As noted above, the linear optimization problem can be, for example, $$y\uparrow = \sum_1^j \alpha_j x_j \uparrow + \beta = (\alpha_1 x_1 + \alpha_2 x_2 + \alpha_3 x_4 \ \ldots + \alpha_{32} x_{16}) + \beta,$$

which uses $x_1$, $x_2$, . . . $x_{16}$ as the basis vectors; when the linear optimization problem is solved as a minimization, this solution results in the coefficients $\alpha_j$ (i.e., $\alpha_1$, $\alpha_2$, $\alpha_3$, . . . $\alpha_{16}$) and residual β, based on using $x_j$ and the y↑ (as the M amount of data). At block 434, the software 150A of the computer system 201A at the sender site 302A is configured to transmit, over the classical communications network such as WAN 102, to the software 150B of the computer system 201B at the receiver site 302B the file 208 of the coefficients $\alpha_j$ (i.e., $\alpha_1$, $\alpha_2$, $\alpha_3$, . . . $\alpha_{16}$) and the residual β. This results in the effective transfer of the desired data from the sender site 302A to the receiver site 302B.

Figure 4C:
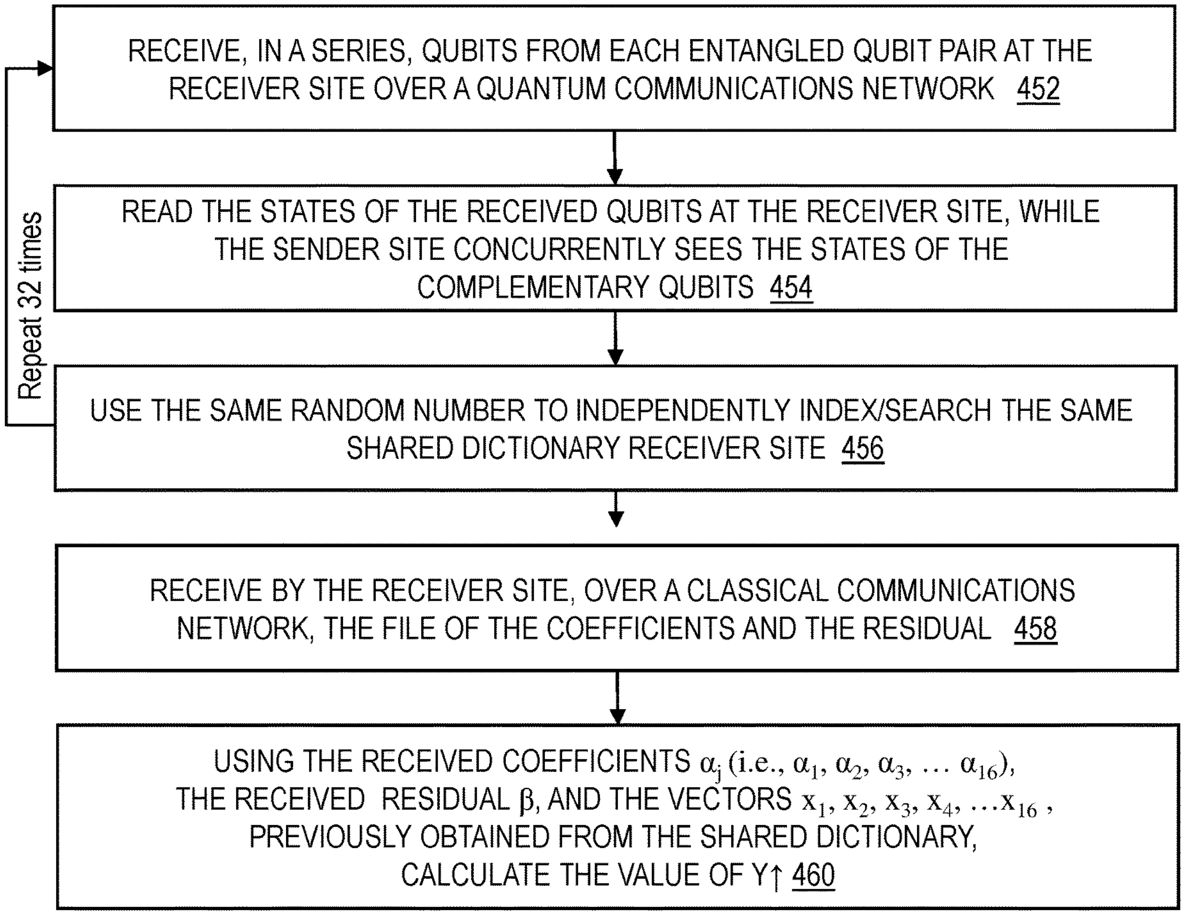
FIG. 4C is a flowchart of a computer-implemented method for receiving data in a manner that improves the bandwidth of classical networks using quantum networks according to one or more embodiments of the present invention.

FIG. 4C is a flowchart of a computer-implemented method 450 for receiving data using a classical communications network supported by a quantum communications network resulting in improved bandwidth for the classical communications network according to one or more embodiments. FIG. 4C illustrates the receipt of the data from the receiver's perspective. Some details described in FIG. 4A may not be repeated in FIG. 4C. The software 150B of computer system 201B at the receiver site 302B is configured to communicate with the quantum system 231B to receive transfer of data discussed herein.

At block 452, the quantum system 231B is configured to receive, in a series, one qubit in each entangled pair of qubits from the quantum system 231A. At block 454, using the measurement system 234B, the quantum system 231B at the receiver site 302B is configured to read the states of the received qubits, where the states at the sender site 302A are the complement of the states read at the receiver site 302B. For the example scenario of 32 qubits being received, reading the states of the received qubits results in 32 random numbers known by the receiver site 302B. At block 456, the software 150B of the computer system 201B is configured to use the same 16 random numbers (i.e., 16 sets of random number) to independently search its shared dictionary 212, in order to obtain, for example, 16 entries of $x_1$, $x_2$, . . . $X_{16}$. At block 458, the software 150B of the computer system 201B at the receiver site 302B is configured to receive, over the classical communications network such as WAN 102, the file 208 of the coefficients $\alpha_j$ (i.e., $\alpha_1$, $\alpha_2$, $\alpha_3$, . . . $\alpha_{16}$) and the residual β. At block 460, using the received coefficients $\alpha_j$ (i.e., $\alpha_1$, $\alpha_2$, $\alpha_3$, . . . $\alpha_{16}$), the residual β, and the vectors $x_1$, $x_2$, $x_3$, $x_4$, . . . $x_{16}$ that were previously obtained from the shared dictionary 212, the software application 150B at the receiver site 302B is configured to solve the linear optimization problem for the value of y↑. Once the software 150B of the computer system 201B uses the coefficients to calculate the value of $$\sum_1^j \alpha_j x_j \uparrow + \beta,$$

the value of y↑ has been transferred from the sender site 302A to the receiver site 302B and is therefore available for use. Accordingly, the software 150B has obtained the value of y↑, which is the M amount of data, without having to transfer the M amount of data over the WAN 102 and/or the quantum communications network 275. This results in the effective receipt of the desired data by the receiver site 302B from the sender site 302A to.

Figure 5:
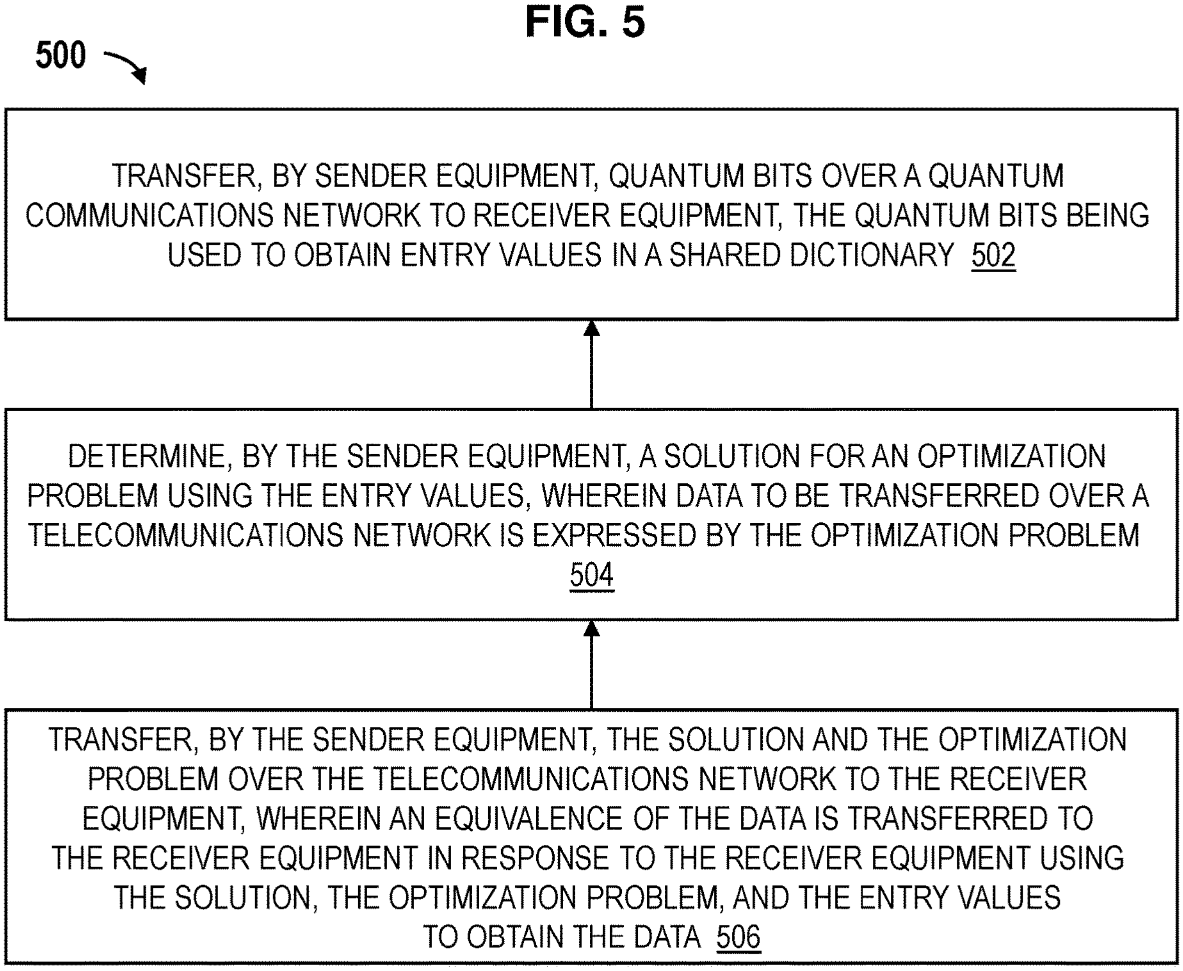
FIG. 5 is a flowchart of a computer-implemented method for transmitting and receiving data using a classical communications network supported by a quantum network resulting in improved bandwidth for the classical communications network according to one or more embodiments of the present invention.

FIG. 5 is a flowchart of a computer-implemented method 500 for transmitting and receiving data using a classical communications network supported by a quantum network resulting in improved bandwidth for the classical communications network according to one or more embodiments. Reference can be made to any of the figures discussed herein.

At block 502 of the computer-implemented method 500, sender equipment (e.g., computer system 201A and/or quantum system 231A) are configured to transfer quantum bits (qubits) over a quantum communications network 275 to receiver equipment (e.g., computer system 201B and/or quantum system 231B), the quantum bits being used to obtain entry values in a shared dictionary 212.

At block 504, the sender equipment (e.g., computer system 201A and/or quantum system 231A) are configured to determine a solution (e.g., the file 208 including the coefficients and residual) for an optimization problem 206 using the entry values, where data (e.g., M amount of data) to be transferred over a telecommunications network (e.g., WAN102) is expressed by the optimization problem 206.

At block 506, the sender equipment (e.g., computer system 201A and/or quantum system 231A) are configured to transfer the solution (e.g., the file 208 including the coefficients and residual) and the optimization problem 206 over the telecommunications network (e.g., WAN 102) to the receiver equipment (e.g., computer system 201B and/or quantum system 231B), where an equivalence of the data is transferred to the receiver equipment in response to the receiver equipment (e.g., computer system 201B and/or quantum system 231B) using the solution (e.g., the file 208 including the coefficients and residual), the optimization problem 206, and the entry values to obtain the data.

In accordance with one or more embodiments, states of the quantum bits are utilized to search the shared dictionary 212 in order to obtain the entry values. Transferring the solution (e.g., the file 208 including the coefficients and residual) and the optimization problem 206 over the telecommunications network (e.g., WAN 102) to the receiver equipment (e.g., computer system 201B and/or quantum system 231B) occurs without transferring the data (e.g., without having to transfer M amount of data) over the telecommunications network.

In accordance with one or more embodiments, an algorithm for the optimization problem 206 is selected from a group consisting of a linear minimization algorithm and a least square reduction algorithm. States of the quantum bits are read to result in a random number, the random number being utilized to search the shared dictionary 212. The solution to the optimization problem 206 comprises coefficients and a residual. In response to the residual being greater than a predetermined threshold, the sender equipment (e.g., computer system 201A and/or quantum system 231A) transfers at least one additional quantum bit resulting in at least one additional random number to search the shared dictionary 212.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

transferring, by sender equipment, quantum bits over a quantum communications network to receiver equipment, wherein a plurality of entangled qubit pairs are formed such that one entangled qubit from each of the plurality of entangled qubit pairs is taken to form a first series of first entangled qubits and another entangled qubit remaining in the plurality of entangled qubit pairs is taken to form a second series of second entangled qubits equal in length to the first series of the first entangled qubits, wherein the first series of the first entangled qubits are sent as the quantum bits to the receiver equipment while the second series remains, wherein the quantum bits are to be used to obtain entry values in a shared dictionary in which the entry values are not sent from the sender equipment to the receiver equipment;

obtaining, by the sender equipment, states of the second series of second entangled qubits corresponding to the quantum bits in response to the receiver equipment reading the first series of the first entangled qubits for the quantum bits, wherein the states result in a random number that is utilized to retrieve the entry values from the shared dictionary, wherein the entry values are vectors to solve an optimization problem;

determining, by the sender equipment, a solution for the optimization problem using the entry values as the vectors, wherein data to be transferred over a telecommunications network from the sender equipment to the receiver equipment is expressed by the optimization problem; and transferring, by the sender equipment, the solution over the telecommunications network to the receiver equipment, wherein an equivalence of the data is transferred to the receiver equipment in response to the receiver equipment using the solution, the optimization problem, and the entry values in order to cause the receiver equipment to obtain the data without transferring any part of the data.

2. The computer-implemented method of claim 1, wherein the states of the quantum bits are utilized to search the shared dictionary in order to obtain the entry values.

3. The computer-implemented method of claim 1, wherein transferring the solution and the optimization problem over the telecommunications network to the receiver equipment occurs without transferring the data over the telecommunications network.

4. The computer-implemented method of claim 1, wherein an algorithm for the optimization problem is selected from a group consisting of a linear minimization algorithm and a least square reduction algorithm.

5. The computer-implemented method of claim 1, wherein the solution comprises coefficients; and wherein the data that is to be transferred is equal to a product of the coefficients times the vectors.

6. The computer-implemented method of claim 1, wherein the solution to the optimization problem comprises coefficients and a residual.

7. The computer-implemented method of claim 6, wherein, in response to the residual being greater than a predetermined threshold, the sender equipment transfers at least one additional quantum bit resulting in at least one additional random number to search the shared dictionary.

8. A system comprising:

a memory having computer readable instructions; and a computer for executing the computer readable instructions, the computer readable instructions controlling the computer to perform operations comprising:

causing a quantum system to transfer quantum bits over a quantum communications network to receiver equipment, wherein a plurality of entangled qubit pairs are formed such that one entangled qubit from each of the plurality of entangled qubit pairs is taken to form a first series of first entangled qubits and another entangled qubit remaining in the plurality of entangled qubit pairs is taken to form a second series of second entangled qubits equal in length to the first series of the first entangled qubits, wherein the first series of the first entangled qubits are sent as the quantum bits to the receiver equipment while the second series remains, wherein the quantum bits are to be used to obtain entry values in a shared dictionary in which the entry values are not sent to the receiver equipment;

obtaining, by the quantum system, states of the second series of second entangled qubits corresponding to the quantum bits in response to the receiver equipment reading the first series of the first entangled qubits for the quantum bits, wherein the states result in a random number that is utilized to retrieve the entry values from the shared dictionary, wherein the entry values are vectors to solve an optimization problem;

determining a solution for the optimization problem using the entry values as the vectors, wherein data to be transferred over a telecommunications network to the receiver equipment is expressed by the optimization problem; and transferring the solution over the telecommunications network to the receiver equipment, wherein an equivalence of the data is transferred to the receiver equipment in response to the receiver equipment using the solution, the optimization problem, and the entry values in order to cause the receiver equipment to obtain the data without transferring any part of the data.

9. The system of claim 8, wherein the states of the quantum bits are utilized to search the shared dictionary in order to obtain the entry values.

10. The system of claim 8, wherein transferring the solution and the optimization problem over the telecommunications network to the receiver equipment occurs without transferring the data over the telecommunications network.

11. The system of claim 8, wherein an algorithm for the optimization problem is selected from a group consisting of a linear minimization algorithm and a least square reduction algorithm.

12. The system of claim 8, wherein the solution comprises coefficients; and wherein the data that is to be transferred is equal to a product of the coefficients times the vectors.

13. The system of claim 8, wherein the solution to the optimization problem comprises coefficients and a residual.

14. The system of claim 13, wherein, in response to the residual being greater than a predetermined threshold, the computer performs the operations to transfer at least one additional quantum bit resulting in at least one additional random number to search the shared dictionary.

15. A computer program product comprising a computer readable storage medium having program instructions embodied therewith, the program instructions executable by a computer to cause the computer to perform operations comprising:

causing a quantum system to transfer quantum bits over a quantum communications network to receiver equipment, wherein a plurality of entangled qubit pairs are formed such that one entangled qubit from each of the plurality of entangled qubit pairs is taken to form a first series of first entangled qubits and another entangled qubit remaining in the plurality of entangled qubit pairs is taken to form a second series of second entangled qubits equal in length to the first series of the first entangled qubits, wherein the first series of the first entangled qubits are sent as the quantum bits to the receiver equipment while the second series remains, wherein the quantum bits are to be used to obtain entry values in a shared dictionary in which the entry values are not sent to the receiver equipment;

obtaining, by the quantum system, states of the second series of second entangled qubits corresponding to the quantum bits in response to the receiver equipment reading the first series of the first entangled qubits for the quantum bits, wherein the states result in a random number that is utilized to retrieve the entry values from the shared dictionary, wherein the entry values are vectors to solve an optimization problem;

determining a solution for the optimization problem using the entry values as the vectors, wherein data to be transferred over a telecommunications network to the receiver equipment is expressed by the optimization problem; and transferring the solution over the telecommunications network to the receiver equipment, wherein an equivalence of the data is transferred to the receiver equipment in response to the receiver equipment using the solution, the optimization problem, and the entry values in order to cause the receiver equipment to obtain the data without transferring any part of the data.

16. The computer program product of claim 15, wherein the states of the quantum bits are utilized to search the shared dictionary in order to obtain the entry values.

17. The computer program product of claim 15, wherein transferring the solution and the optimization problem over the telecommunications network to the receiver equipment occurs without transferring the data over the telecommunications network.

18. The computer program product of claim 15, wherein an algorithm for the optimization problem is selected from a group consisting of a linear minimization algorithm and a least square reduction algorithm.

19. The computer program product of claim 16, wherein the solution comprises coefficients; and wherein the data that is to be transferred is equal to a product of the coefficients times the vectors.

20. The computer program product of claim 15, wherein the solution to the optimization problem comprises coefficients and a residual.

* * * * *